UNITED STATES PATENT OFFICE.

JOHN H. HAMLIN, OF SALT LAKE CITY, UTAH.

PROCESS FOR TREATING BUILDING MATERIAL.

1,098,723. Specification of Letters Patent. Patented June 2, 1914.

No Drawing. Application filed January 15, 1913. Serial No. 742,271.

*To all whom it may concern:*

Be it known that I, JOHN H. HAMLIN, a citizen of the United States, residing at Salt Lake City, in the county of Salt Lake and State of Utah, have invented certain new and useful Improvements in Processes for Treating Building Material, of which the following is a specification.

My invention relates to a process for treating a stone or brick wall, and has for its object to provide a process for surface treating stone (either natural or artificial), brick, terra cotta or other building material, either before or after it is placed in the wall, to render it water-proof, without altering the form, appearance or usefulness.

The process consists of crushing and granulating, to the same fineness as the grains of the stone, some pieces of like or similar stone. I use the same class of material as that used in the wall, in order that the treated stone or wall will have its original color and appearance restored and retained. This powdered or granulated raw material is saturated with a transparent, water-proof chemical fluid containing some rubber and which is cementitious in its nature and properties and is insoluble in water. The saturated, granulated material is stirred into a plastic mass and is then heated and vulcanized, which treatment will leave it in larger sized lumps of irregular shape and friable. Each individual particle thereof will be coated or plated with a transparent water-proof material, so that when again crushed and granulated, which is the next step in the process, each small particle will be surrounded with a film or coating of a water-proof substance which is transparent.

The stone to be treated, preferably after it is placed in the wall, is given a primary coating of an adhesive chemical solution, such as varnish sizing or glued calcimine to which the above described granulated and prepared material will adhere and integrally fuse when allowed to dry thereon. The said granulated material is then applied by blowing or spraying it with compressed air to form a secondary coating on the previously prepared surface of the wall to be treated and adhering thereto will, when dry, give to said wall so treated the exact appearance of the original wall or stone, but said wall or stone will have a water-proof surface, and being water-proof will not absorb moisture and be discolored by stains, soot, dust or other matter which disfigures our buildings. When the plating or veneering has set and dried, which will take about five days, the wall will not be subject to absorption, freezing, thawing and will not disintegrate.

I am aware that others have coated walls and building material with a sticky cementitious material and applied sand thereto, by means of a compressed air blast, to coat said wall with a stone appearing material.

The new and novel features of my process are the water-proof nature and transparency of the coating on the granulated material, and the use of the same stone particles or brick or other material of which the wall was originally built; thereby not changing the appearance of the wall, and at the same time placing it in such condition that it will retain its original appearance.

My treatment is the reverse of the sand blast process of restoring the original color and appearance of a wall, which consists of cutting away the discolored surface of the wall by a blast of sharp sand, while my process coats the wall with an impervious plating or veneers of water-proof similarly colored material. If the wall is built of granite, powdered granite, which has been previously treated with the transparent water-proof liquid, applied to the adhesive wall, and if gray sand stone is in the wall, gray sand stone is used.

Having thus described my process I desire to secure by Letters Patent and claim:—

1. The herein described process of treating walls and building material, consisting of applying an adhesive chemical solution to the material to be treated as a primary coating, and then before the same has been allowed to set or dry to apply a secondary coat of a previously prepared granulated material, which has been made water-proof by a transparent chemical solution.

2. The herein described process for treating walls and building material, consisting of applying an adhesive chemical solution to the material to be treated, to which a blast of granulated material is applied, which material has been rendered water-proof by applying a transparent chemical solution thereto.

3. A process and method for treating walls consisting of coating the wall with an adhesive solution, and then covering said coated wall with minute particles of stone which have been previously coated with a transparent water-proof chemical.

In testimony whereof I have affixed my signature in presence of two witnesses.

JOHN H. HAMLIN.

Witnesses:
 SAM RANEY,
 R. B. McINTOSH.